A. C. HARRISON.

Damper-Regulator for Steam-Boilers.

No. 8,731. Reissued June 3, 1879.

Witnesses

Alexander Patterson Jr.

Harry Smith

Inventor

Alfred C. Harrison by his Attorneys

Howson and Son

THE NORRIS PETERS CO., PHOTO-LITHO., WASHINGTON, D. C.

UNITED STATES PATENT OFFICE.

ALFRED C. HARRISON, OF PHILADELPHIA, PENNSYLVANIA.

IMPROVEMENT IN DAMPER-REGULATORS FOR STEAM-BOILERS.

Specification forming part of Letters Patent No. 214,656, dated April 22, 1879; Reissue No. 8,731, dated June 3, 1879; application filed May 7, 1879.

*To all whom it may concern:*

Be it known that I, ALFRED C. HARRISON, of Philadelphia, Pennsylvania, have invented a new and useful Improvement in Damper and Throttle-Valve Regulators for Steam-Boilers, of which the following is a specification.

My invention consists in combining the diaphragm and pivoted lever of a damper-regulator with a series of weights, in the manner described hereinafter, so that the operation of the damper connected to the said lever shall be in accordance with the excess of pressure of steam, my invention being also applicable to the operating of a throttle-valve in a steam-pipe.

Figure 1:
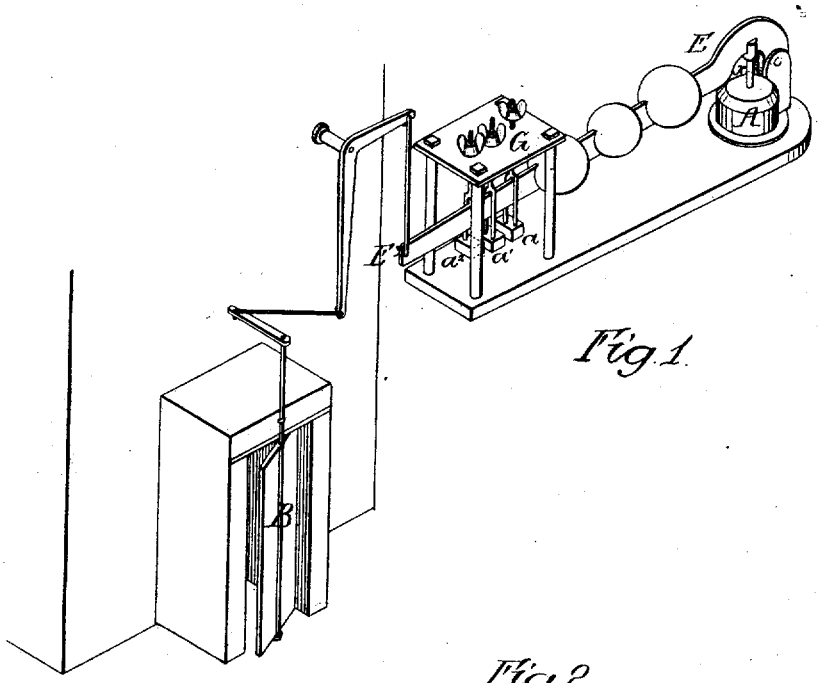
Figure 2:
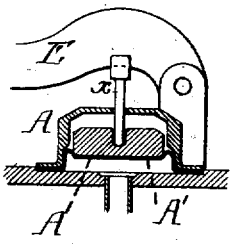

In the accompanying drawings, Figure 1 is a perspective view of a damper-regulator with my improvement, and Fig. 2 a sectional view of part of the regulator.

A is the casing, containing an elastic diaphragm, A′, (steam from the boiler acting through the medium of this diaphragm,) a suitable block or piston, and a rod, $x$, on a lever, E, which is pivoted to the casing A, the outer end of the lever being connected to a damper, B, in the flue of a boiler by such a system of rods, levers, and other appliances as the location of the said damper in respect to the lever may suggest. This is a well-known device in common use for causing the pressure of steam to operate a damper in the flue of a steam-boiler, and is described in the Letters Patent No. 10,387, granted to Patrick Clark, January 3, 1854.

There is one defect in this otherwise useful instrument, and that is its tendency to entirely close the damper, whether the excess of pressure of steam in the boiler be great or small. Hence the operation of the damper is not in accordance with the degree of pressure which exceeds the desired normal pressure of steam in the boiler, and the consequence of this is that the damper is frequently closed when a slight excess in the pressure of steam occurs, and when it should be partly open.

It is well known to engineers that to cut off, or nearly cut off, the draft in a boiler-flue at intervals is to interfere with the economical consumption of fuel, for while the heat beneath the boiler is diminished as long as the damper remains closed, a portion of the fuel is converted into ashes and clinkers, owing to the heat which is confined to the fire-place, so that when the flue is again opened time must elapse before the burning fuel can resume its proper combustion, the services of the fireman being, moreover, required in clearing away the ashes and clinkers.

I erect above the weighted lever E, Fig. 1, a plate, G, from which I suspend any desired number of weights, $a$ $a'$ $a''$, by rods, which, above the plate, are furnished with thumb-screws, and below are forked, so as to straddle the lever E.

The suspension-rods and their weights are so adjusted by the thumb-screws that the lever, when it rises under the pressure of steam, will, after reaching a given altitude, be loaded by one weight, and after overcoming this load and rising to a farther height will receive another load, a third load being added by another weight after the lever reaches a still higher altitude.

When there is a slight excess of pressure of steam in the boiler, the lever, instead of being raised far enough to entirely close the damper, as in previous devices of this class, will be arrested in its upward movement by one of the weights, which gives the lever an additional load to carry and to oppose the excess of pressure, the damper being closed to the limited extent determined by this additional load.

Should the pressure of steam in the boiler be reduced and resume its normal condition, the lever will fall to its original position, the weight will remain suspended clear of the lever, and the damper will be entirely open. If, on the other hand, there should be such an excess of pressure of steam as to raise the lever loaded by the first weight, it will, after rising a short distance, be further loaded with a second weight, and there will be a further contraction of the flue by the damper, a still further rise of the lever resulting in the arresting of the latter by a third load and a further contraction of the flue.

It will be seen that the lever and damper do not move uniformly and simultaneously with the increase or diminution of the excess of pressure of steam, but intermittently—that is to say, the lever and damper move under a given excess of pressure until the lever receives its first load, and both remain quiescent until the steam resumes its normal pressure, or until the excess of pressure is so great that it will overcome the first load and be arrested by the second, or until the first and second loads are raised by the lever and the latter is arrested by a third load; but this intermittent action of the damper serves to bring about the desired result—that is, such a control of the combustion of fuel by the damper that the above-described evil effects cannot take place.

I claim as my invention—

The combination, in a damper or throttle-valve regulator, of a diaphragm, a pivoted lever, the damper or valve connected to the same, and a series of weights, by which the said pivoted lever will be loaded in succession as the pressure of steam on the diaphragm increases, substantially as set forth.

In testimony whereof I have signed my name to this specification in the presence of two subscribing witnesses.

ALFRED C. HARRISON.

Witnesses:

WILLIAM J. COOPER,
HARRY SMITH.